United States Patent
Longo

(10) Patent No.: US 7,621,562 B2
(45) Date of Patent: Nov. 24, 2009

(54) STEERING COLUMN

(75) Inventor: Biagio Longo, San Giovanni In Persiceto (IT)

(73) Assignee: A.M.A. S.p.A. (IT)

( * ) Notice: Subject to any disclaimer, the term of this patent is extended or adjusted under 35 U.S.C. 154(b) by 0 days.

(21) Appl. No.: 11/940,012

(22) Filed: Nov. 14, 2007

(65) Prior Publication Data
US 2008/0150269 A1 Jun. 26, 2008

(30) Foreign Application Priority Data
Nov. 14, 2006 (IT) .......................... BO2006A0775

(51) Int. Cl.
*B60D 1/18* (2006.01)
(52) U.S. Cl. ..................................... 280/775
(58) Field of Classification Search ................ 280/775, 280/492, 493; 74/492, 493
See application file for complete search history.

(56) References Cited
U.S. PATENT DOCUMENTS

| | | | | |
|---|---|---|---|---|
| 3,395,930 A | * | 8/1968 | Morgan | 280/775 |
| 4,656,888 A | * | 4/1987 | Schmitz | 74/493 |
| 4,793,204 A | * | 12/1988 | Kubasiak | 74/493 |
| 5,439,252 A | * | 8/1995 | Oxley et al. | 280/775 |
| 5,507,521 A | * | 4/1996 | Steffens, Jr. | 74/493 |
| 5,743,151 A | | 4/1998 | Khalifa et al. | |
| 5,899,497 A | * | 5/1999 | Spencer et al. | 280/775 |
| 6,390,505 B1 | * | 5/2002 | Wilson | 280/775 |
| 7,083,198 B2 | * | 8/2006 | Lee | 280/775 |
| 2005/0093281 A1 | * | 5/2005 | Nishioka et al. | 280/775 |
| 2005/0145056 A1 | | 7/2005 | Maida et al. | |

\* cited by examiner

*Primary Examiner*—Paul N Dickson
*Assistant Examiner*—Robert A Coker
(74) *Attorney, Agent, or Firm*—The Belles Group P.C.

(57) ABSTRACT

A steering column, in which a steering wheel is connected to a jointed shaft extending through a steering tube, a first telescopic portion of which, arranged at the lower part thereof, presents a lower end anchorable to a support, and a second portion of which, arranged at the upper part thereof, is coupled to the first portion to rotate about a joint axis; and in which a control member is movable towards an operative position to disengage, against the bias of a spring, a pin element from one of a series of holes obtained on a sector integral with one of the two positions of the steering tube to adjust the angular position of the steering wheel about the joint axis.

8 Claims, 4 Drawing Sheets

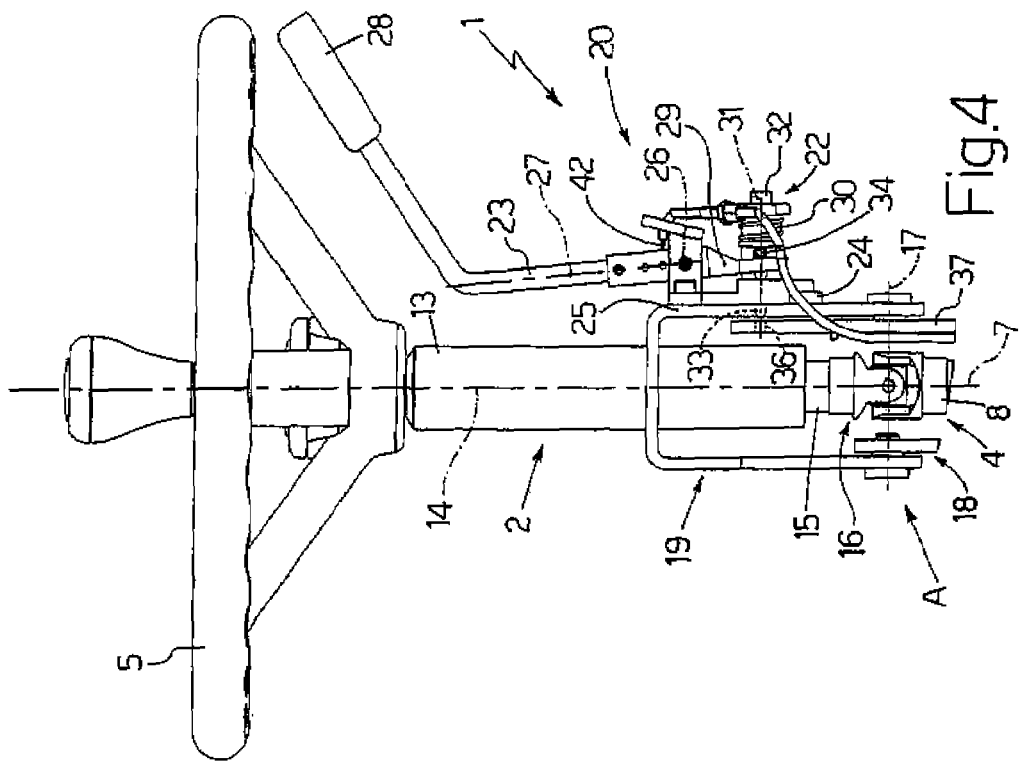
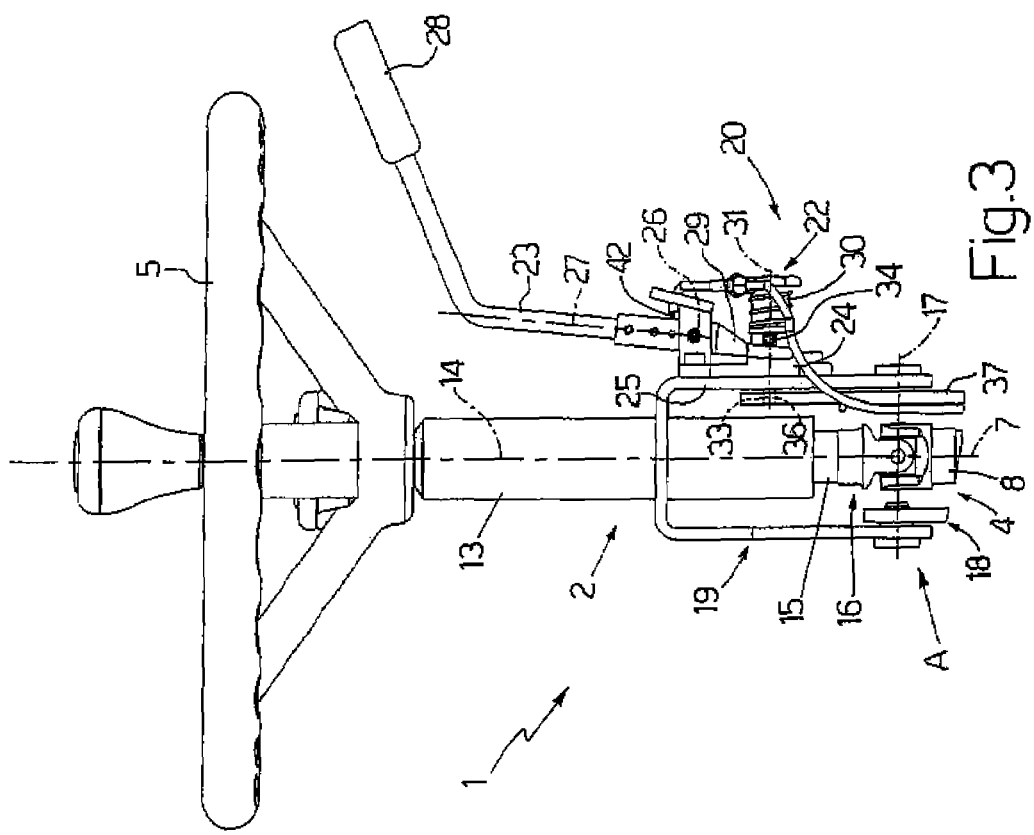

STEERING COLUMN

CROSS-REFERENCE TO RELATED PATENT APPLICATIONS

This application claims priority under 35 U.S.C. §119(a) to Italian Patent Application No. BO2006A 000775, filed Nov. 14, 2006, the entirety of which is hereby incorporated by reference.

FIELD OF THE INVENTION

The present invention relates to a steering column.

BACKGROUND OF THE INVENTION

Specifically, the present invention relates to a steering column particularly but not exclusively adapted to be used on farming machines, earth-moving machines, lift tucks and the like and of the type comprising a steering tube presenting a lower end anchorable to a support, a shaft rotationally mounted inside the steering tube; a steering wheel angularly coupled to an upper end of the shaft; and an control device of the position of the steering wheel with respect to the lower end of the steering tube; the steering tube comprising a fixed lower portion of adjustable length and presenting a first axis and an upper portion presenting a second axis and coupled to the lower portion to rotate with respect to the lower portion about a third axis transverse to the first and to the second axis.

SUMMARY OF THE INVENTION

It is the object of the present invention to provide a steering column, in which the control device is simple and cost-effective to manufacture and easy to implement.

According to the present invention, there is provided a steering column comprising a steering tube presenting a lower end anchorable to a support, a shaft rotationally mounted inside the steering tube; a steering wheel angularly coupled to an upper end of the shaft; and an control device of the position of the steering wheel with respect to the lower end of the steering tube; the steering tube comprising two portions, the first of which, arranged at the lower part thereof, is fixed, of adjustable length and presents a first axis and the second of which, arranged at the upper part thereof, presents a second axis and is coupled to the first portion to rotate with respect to the first portion about a third axis transverse to the first and to the second axis; the steering column being characterized in that the control device comprises a control device for adjusting the angular position of the steering wheel with respect to the first portion about the third axis, the control device comprising a sector integral with one of the two portions and provided with a plurality of holes obtained through the sector parallelly to the third axis; a pin element integral with the other of the two portions, parallel to the third axis and movable, in a parallel direction to the third axis itself, from and to a position of selective engaging of one of said holes and of locking of the angular position of the steering wheel about the third axis; and a control member of said pin element.

Preferably, the sector is mounted on the first portion and the control member is mounted on the second portion.

Preferably, the control member is a manually actuated lever and is mounted on the second portion to rotate, with respect to the second portion itself, about a fourth axis transverse to the second and the third axis.

According to a preferred embodiment, the second pin element is movable from the engaging position against the bias of elastic means and presents transverse resting pins of the elastic biasing means of the pin element itself towards the engaging position; and the lever is a rocker lever, one arm of which is defined by a fork adapted to engage the transverse pins to displace the pin element against the bias of the elastic means towards a disengaging position of the sector.

BRIEF DESCRIPTION OF THE DRAWINGS

The invention will now be described with reference to the accompanying drawings which illustrate a non-limitative embodiment thereof, in which:

FIGS. 3 and 4 show an enlarged scale detail of the steering column in FIG. 1 arranged in corresponding, different operative configurations.

DETAILED DESCRIPTION OF THE INVENTION

Figure 1:
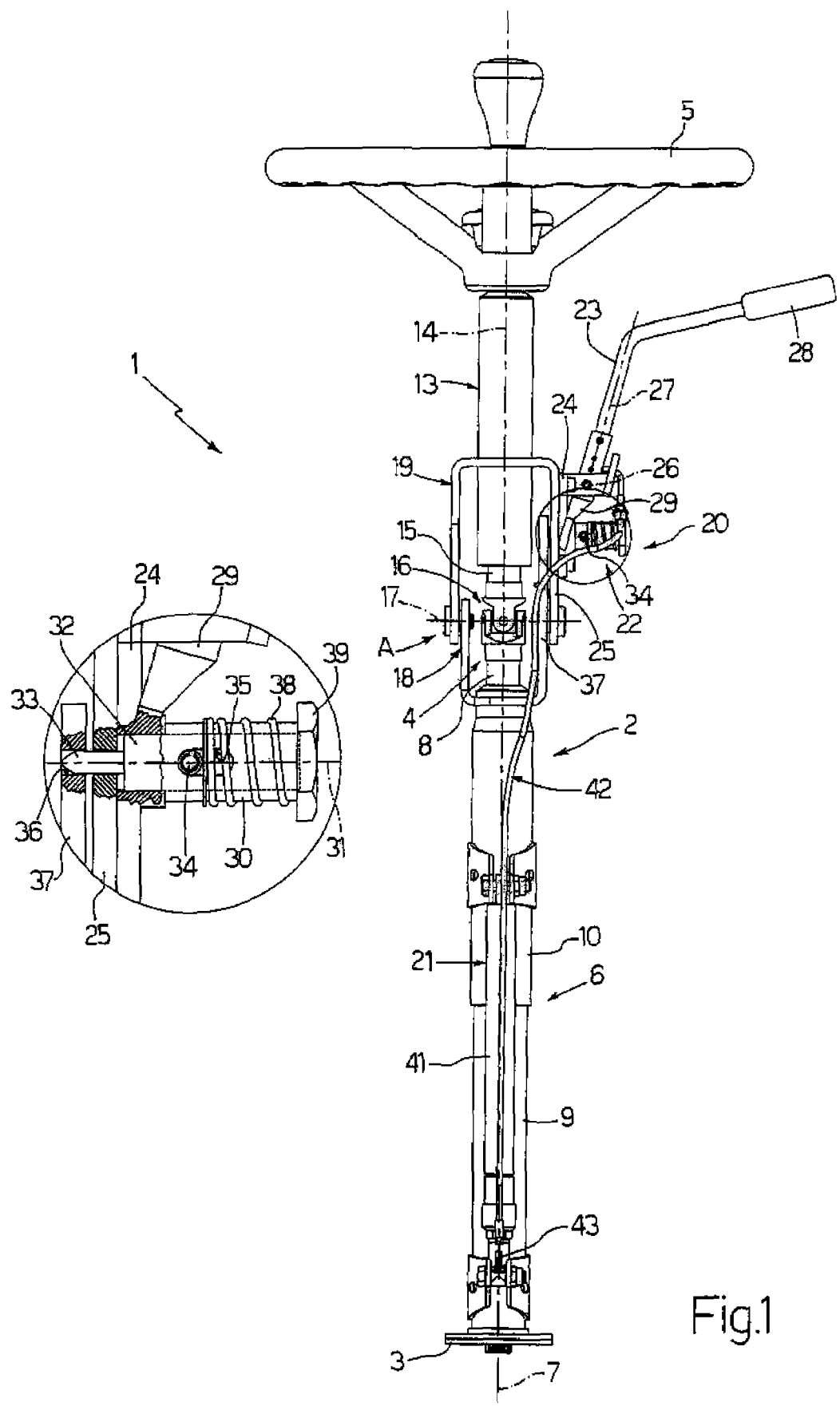
FIG. 1 is a front elevation view of a preferred embodiment of the steering column of the present invention.
Figure 2:
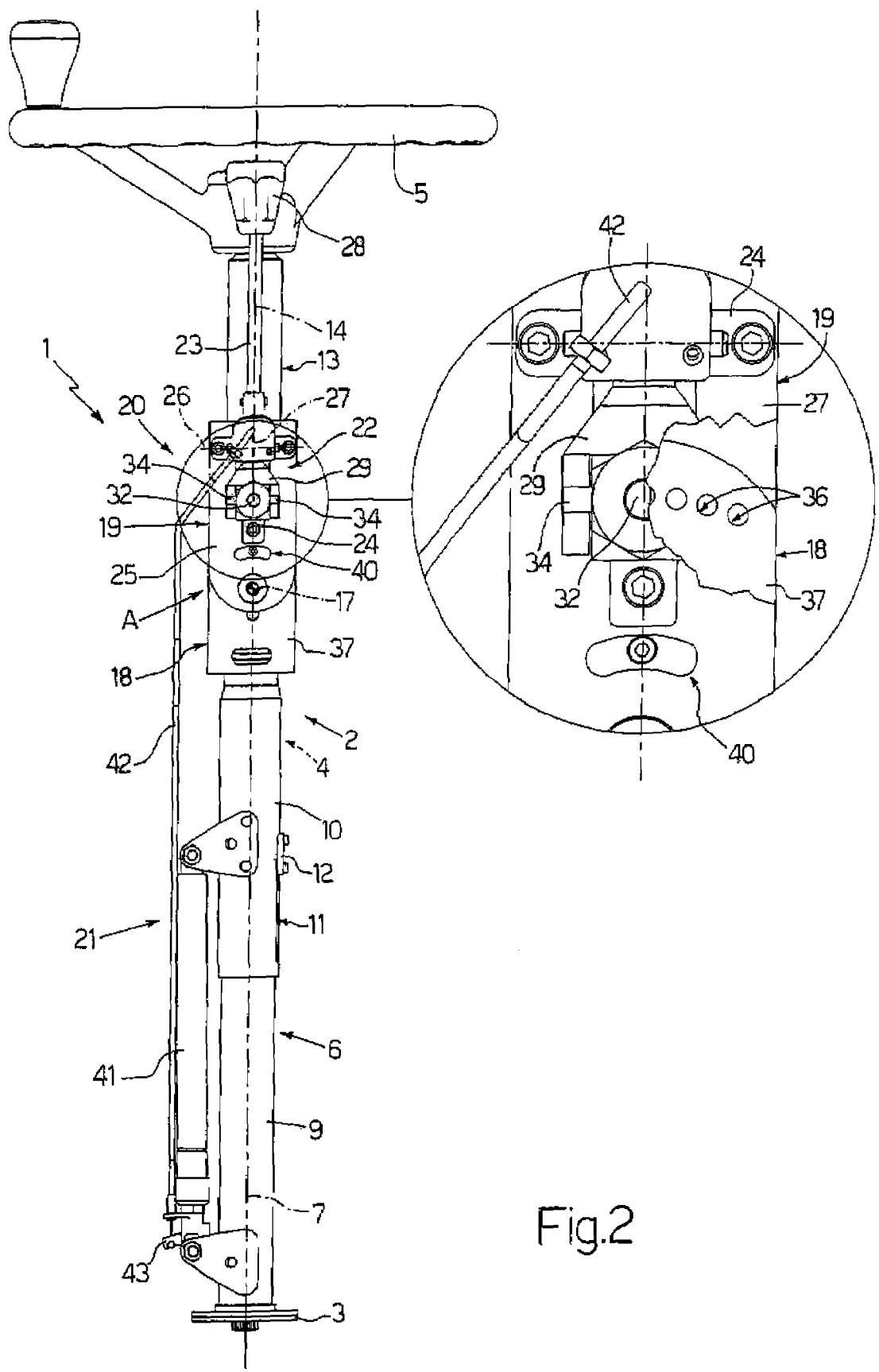
FIG. 2 is a side elevation view of the steering column in FIG. 1.

In FIGS. 1 and 2, numeral 1 indicates as a whole a steering column for a vehicle (not shown), preferably, but not exclusively, a lift truck.

The steering column 1 comprises a steering tube 2 anchored at its lower part to a chassis (not shown) of the vehicle by means of a support plate 3 and accommodating a control shaft 4, which is provided, at one end thereof, with a steering wheel 5 and is free to rotate inside the steering tube 2 to transmit the rotations impressed by an operator on the steering wheel 5 itself to a steering mechanism (not shown) of the vehicle.

The steering tube 2 comprises a lower telescopic portion 6, which presents an essentially vertical fixed axis 7, accommodates a corresponding lower portion 8, also telescopic, of the shaft 4 and comprises, in turn, two tubular bodies 9 and 10. The tubular body 9 is partially arranged inside the tubular body 10 and is integral with the support plate 3, and the tubular body 10 is telescopically coupled to the tubular body 9 to slide along the axis 7 with respect to the tubular body 9 itself.

Furthermore, the tubular body 10 presents a longitudinal slot 11, which is engaged in an axially sliding manner, by a projection 12 integral with the tubular body 9 and defines, with the projection 12 itself, an axial end stroke device 6a along the axis 7 and an angular lock to prevent the tubular body 10 from rotating, with respect to the tubular body 9, about the axis 7.

In addition to the lower telescopic portion 6, the steering tube 2 comprises an upper tubular portion 13, which presents a longitudinal axis 14 and accommodates a corresponding upper portion 15 of the shaft 4, which is coupled at its lower part to the lower portion 8 of the shaft 4 by means of a Cardan joint 16 of known type and carries the steering wheel 5 fitted at the upper end thereof.

The upper portion 13 is connected to the lower portion 6 of the steering tube 2 by means of a hinged element A, which allows the upper portion 13 to rotate, with respect to the lower portion 6, about a fixed axis 17 perpendicular to the axis 7 and passing through the centre of the cross of the Cardan joint 16.

Specifically, as shown in FIGS. 1 and 2, the hinged element A comprises a U-shaped bracket 18 comprising a central plate fixed onto the tubular body 10 and two end plates extending from the central plate towards the steering wheel 5 and hinged, by means of corresponding pins coaxial to the axis 17, to corresponding end plates of a further U-shaped bracket 19 fixed, by means of a corresponding central plate, onto the upper portion 6 and presenting a concavity opposite to that of the bracket 18.

Therefore, the presence of the lower telescopic portion 6 and the presence of the hinged element A between the lower portion 6 and the upper portion 13 and of the Cardan joint 16 between the lower portion 8 and the upper portion 15 of the shaft 4 confer to the steering wheel 5 two further degrees of freedom, i.e. allow the steering wheel 5 to be raised or lowered with respect to the support plate 3, i.e. to the chassis, following the variation of the length of the lower portion 6 and to rotate about the axis 17 following the variation of the inclination of the upper portion 13 with respect to the lower portion 6.

In order to allow to modify the attitude of the steering wheel 5 and to lock the steering wheel 5 in an established position, the steering column 1 comprises an control device 20 which comprises, in turn, a control device 21 of the length of the lower portion 6 of the steering tube 2, i.e. of the height of the steering wheel 5 with respect to the support plate 3, and a control device 22 of the angular position of the steering wheel 5 about the axis 17.

The control devices 21 and 22 have a single control member in common, constituted, in the example shown, by a rocker lever 23, the manual operation of which allows to sequentially adjust, in the manner which will be explained below, the axial and angular position of the steering wheel 5.

As shown in FIGS. 1, 3 and 4, the rocker lever 23 is hinged onto a bracket 24 integral with an end plate 25 of the bracket 19 to oscillate about an axis 26 transverse to the axis 17 and comprises a first L-shaped arm, which extends from the axis 26 upwards and towards the steering wheel 5, presents an axis 27 perpendicular to the axis 26 and carries an actuating handle 28 integrally connected to the free end, and a second arm, which extends from axis 26 downwards and is defined by a fork 29 arranged, in a rest position of the lever 23 (FIG. 1), against the plate 25 of the bracket 19.

As shown in FIG. 1 and, in greater detail, in the enlarged detail in FIG. 1 itself, the control device 22 comprises a hollow cylindrical body 30 integral with the bracket 24, protruding from the bracket 24 itself outwards along an axis 31 parallel to the axis 17 and accommodating in an axially sliding manner a shaft 32 coaxial to the axis 31 and provided, at one end thereof facing the steering tube 2, with a pin 33 coaxial to the axis 31 and presenting a frustum-conical tip.

Furthermore, at a central portion thereof the shaft 32 carries connected two pins 34 protruding from the shaft 32 perpendicularly to the axis 31 and engaging in an axially sliding manner in corresponding slots 35 obtained through the side wall of the hollow body 30 to define, with pins 34, an axial end stoke device of the shaft 32 along the axis 31 and an angular lock of the shaft 32 itself about the axis 31.

The pins 34 are adapted, in use, as will be better explained below, to be engaged by the fork 29 to displace, under the bias of the fork 29 itself, the shaft 32 from a rear position (FIG. 1), corresponding to the rest position of the lever 23 and to a locking position of the control device 22, to an advanced position (FIG. 4) corresponding to an operative position of the lever 23 and to an adjustment position of the control device 22.

As shown in the enlarged details in FIGS. 1 and 2, when the shaft 32 is in its rear position, the pin 33 extends from the shaft 32 itself towards the steering tube 2 through a hole obtained in the plate 25 in a coaxial position to the axis 31 and engages, with its frustum conical tip, a hole of a plurality of through holes 36 obtained through a plate 37 of the bracket 18 arranged facing the plate 25. The holes 36 are uniformly distributed along an arc of a circle coaxial to the axis 17 and with a predetermined distribution angle, preferably of 5°.

Therefore, when the pin 33 engages one of the holes 36, the bracket 18 and the bracket 19 become reciprocally integral and, consequently, the upper portion 13 is locked with respect to the lower portion 6 about the axis 17.

The rear position of the shaft 32 is thus a locking position of the control device 22.

The control device 22 further comprises a helical spring 38 compressed between the pins 34 and a ring nut 39 mounted at the end of the hollow body 30 to stably maintain the pin 33 in an engagement position into one of the holes 36 when the shaft 32 is arranged in the rear position and the control device 22 is in the locking position.

The control device 22 finally comprises a guide and angular end stroke device 40 of the upper portion 13 defined by a curved slot obtained on the plate 37 and engaged in a sliding manner by a pin integral to the plate 25 and parallel to the axis 17.

The control device 21 comprises a gas spring 41 (of known type) interposed between the tubular body 9 and the tubular body 10 of the lower telescopic portion 6 and adapted to be activated by the lever 23 by means of a tie-rod 42 connected, at a lower end, to a control lever 43 of an operation valve (not shown) of the gas spring 41 and, at the opposite end, locked on the first arm of the rocker lever 23 by means of a dowel.

The tie-rod 42 slides inside a sheath, the ends of which are fixed on one side to a support of the gas spring 41 and, on the other side, to the bracket 24.

As shown in FIG. 1, in a closing position of the operation valve (not shown) of the gas spring 41, the control lever 43 of the valve is arranged downwards and the tie-rod 42 is pulled between the control lever 43 and the first arm of the lever 23 so as to maintain the lever 23 in the rest position, i.e. with the fork 29 pushed against the plate 25. In this position, the angle formed between the axis 27 and the axis 14 is preferably of approximately 16°.

The operation of the control device 20 will be described below from the configuration shown in FIG. 1, in which the lower portion 6 is in the minimum extension configuration, the upper portion 13 is essentially vertical, i.e. the axis 14 is coaxial to the axis 7, the lever 23 is in the rest position and the pin 33 engages a central hole of the plurality of holes 36.

If, from this position, the operator desires to modify the attitude of the steering wheel 5 as far as both the height and the inclination of the steering wheel 5 itself are concerned, the control device 20 allows to make both adjustments by acting on the control device 21 and, subsequently, on the control device 22 by operating the rocker lever 23 in two sequential steps.

In a first step, which is a step of adjusting the height of the steering wheel 5 by means of the control device 21, the operator pulls the handle 28 towards him or herself, imparting to the lever 23 a rotation (counterclockwise in FIG. 1) about the axis 26 to take the fork 29 into abutment against the pins 34 (FIG. 3). The rotation of the lever 23 about the axis 26 is preferably of approximately 11°.

Figure 5:
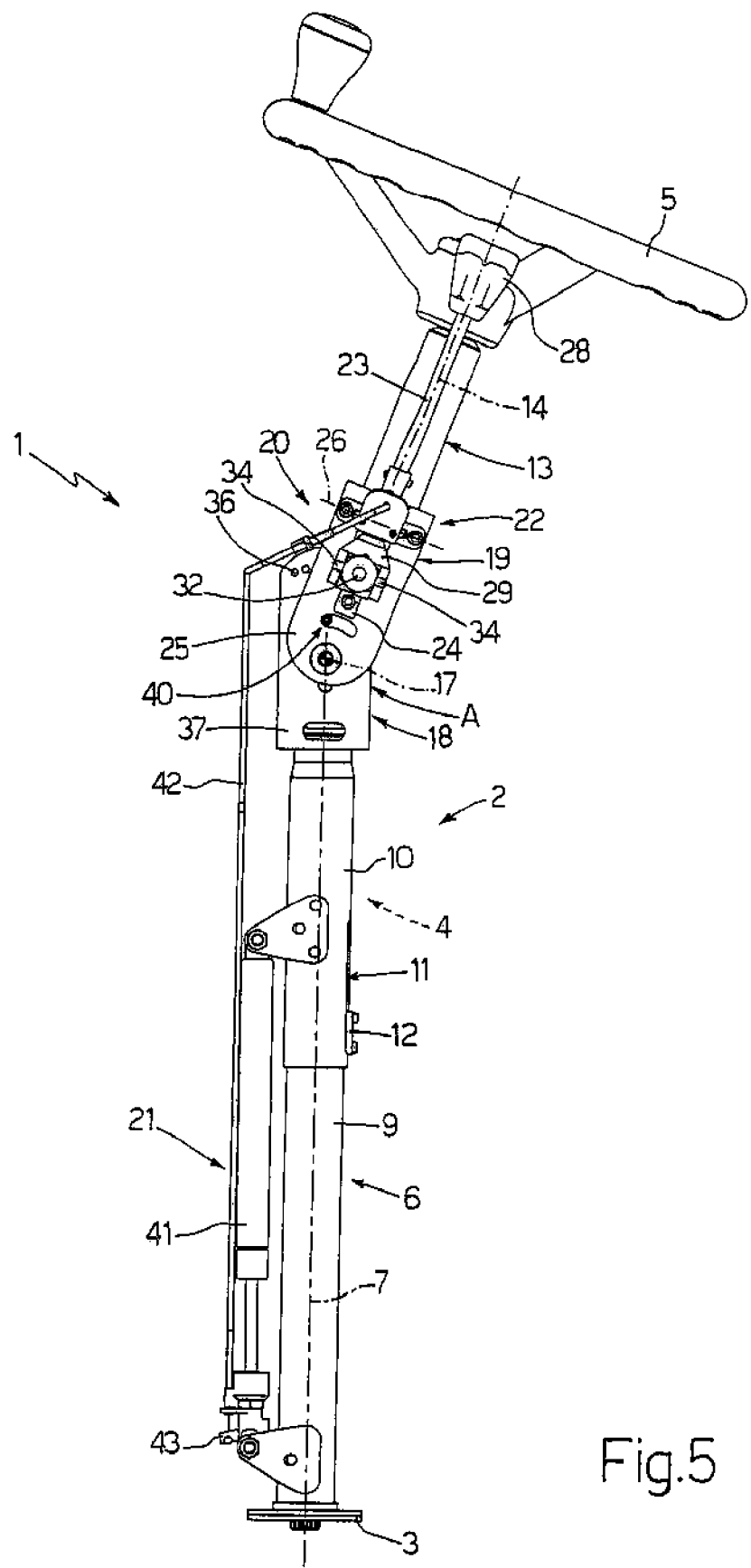
FIG. 5 shows the steering column in FIG. 2 arranged in a different operative configuration.

When rotating about the axis 26, the first arm of the lever 23 displaces the tie-rod 42 towards the steering tube 2 determining the raising of the control lever 43 and the consequent opening of the operation valve of the gas spring 41. At this point, it is sufficient for the operator, to impart a slight upward pull (or a downward push in the case the starting configuration is of extension of the lower portion 6) to the steering wheel 5 to vary the length of the lower telescopic portion 6 and consequently modify the height of the steering wheel 5 (FIG. 5).

In a second step, which is a step of adjusting the inclination of the steering wheel 5, the operator continues to pull the handle 28 toward him or herself, in the same direction, making the lever 23 further rotate about the axis 26 in the same direction of rotation. The rotation of the lever 23 about the axis 26 is preferably of approximately 11°.

Following the latter rotation, the fork 29 displaces the pins 34 along the slots 35, against the bias of the spring 38, making the shaft 32 consequently slide inside the hollow body 30 and determining, as a consequence, the progressive extraction of the pin 33 from the hole 36 in which it is engaged. When the pins 34 reach the end stroke, the end of the shaft 32 opposite to the pin 33 axially protrudes form the ring nut 39 and the pin 33 is completely outside the previously occupied hole 36 (FIG. 4).

In this position, the bracket 19 is released from the bracket 18 and is free to rotate, along with the upper portion 13, about the axis 17 by effect of a transversal push imparted by the operator to the steering wheel 5.

After having reached the required inclination of the steering wheel 5, the operator releases the lever 23 determining the return, under the bias of the spring 38, of the pins 34 and, thus, of the shaft 32 towards the steering tube 2 with consequent insertion of the pin 33 in one of the holes 36 angularly displaced with respect to the previously engaged hole 36 (FIG. 5).

If in the moment in which the lever 23 is released and the shaft 32 moves back, the pin 33 is not aligned with one of the holes 36, the pin 33 stops against the plate 25 in an intermediate position between one hole 36 and the other and it is sufficient, for the operator, to impart a slight oscillation about the axis 17 to the steering wheel 5 to determine the insertion of the pin 33 in one of the holes 36.

The release of the lever 23 implies, at the same time, also the return of the tie-rod 42 into the starting position with concurrent lowering of the control lever 43, closing of the operation valve of the gas spring 41 and consequent locking of the tubular body 10 with respect to the tubular body 9 along the axis 7.

In case the operator desires to adjust only the height and not the inclination of the steering wheel 5, the second step is not carried out and the lever 23 is released at the end of the first step.

However, despite the actuation of the control device 22 being sequential, the operator may also adjust the inclination of the steering wheel 5 only, without modifying the height attitude of the steering wheel 5 itself. Indeed, although the oscillation of the lever 23 for determining the extraction of the pin 33 from the holes 36 also implies pulling the tie-rod 42 and the consequent activation of the gas spring 41, the latter is calibrated so that the rotation of the upper portion 13 about the axis 17 alone is not sufficient to modify the length of the lower portion 6 if, at the same time, no raising or lowering push is voluntarily imparted to the steering wheel 5.

What is claimed is:

1. A steering column comprising a steering tube (2) having a lower end anchorable to a support (3), a shaft (4) rotationally mounted inside the steering tube (2); a steering wheel (5) angularly coupled to an upper end of the shaft (4); a control device (20) for adjusting the position of the steering wheel (5) with respect to the lower end of the steering tube (2); the steering tube (2) comprising a lower portion (6) and an upper portion (13), the lower portion (6) being adjustable in length along a first axis (7), and the upper portion (13) having a second axis (14), the upper portion (13) coupled to the lower portion (6) to rotate about a third axis (17) transverse to the first and second axis (7, 14); the control device (20) comprising a control mechanism (22) for adjusting an angular position of the steering wheel (5) with respect to the lower portion (6) about the third axis (17), the control mechanism (22) comprising a plate (37) integral with one of the lower or upper portions (6, 13) and provided with a plurality of holes (36); a pin element (33) integral with the other of the lower or upper portions (6, 13), the pin element (33) being parallel to the third axis (17) and movable in a parallel direction to the third axis (17) between a locking position in which the pin element (33) selectively engages one of the holes (36) thereby locking the angular position of the steering wheel (5) about the third axis (17), and an unlocking position in which the pin element (33) disengages the holes; and a control member (23) operably connected to the pin element (33).

2. A steering column according to claim 1, wherein the plate (37) is mounted on the lower portion (6) and the control member (23) is mounted on the upper portion (13).

3. A steering column according to claim 1, wherein the control member (23) is a manually operable lever (23).

4. A steering column according to claim 3, wherein the lever (23) is mounted on the upper portion (13) to rotate, with respect to the upper portion (13), about a fourth axis (26).

5. A steering column according to claim 4, wherein the fourth axis (26) is transverse to the second axis (14) and to the third axis (17).

6. A steering column according to claim 1, wherein the pin element (33) is movable from the locking position against an elastic biasing means (38).

7. A steering column according to claim 6, wherein the pin element (33) includes transverse resting pins (34), the elastic biasing means (38) towards the locking position.

8. A steering column according to claim 7, wherein the lever (23) is a rocker lever, one arm of which is defined by a fork (29) adapted to engage the transverse pins (34) to displace the pin element (33) against the elastic biasing means (38) towards the unlocking position.

* * * * *